US012645317B2

(12) United States Patent
Tseng et al.

(10) Patent No.: US 12,645,317 B2
(45) Date of Patent: Jun. 2, 2026

(54) TOUCH DISPLAY DEVICE

(71) Applicant: E Ink Holdings Inc., Hsinchu (TW)

(72) Inventors: Hung Wei Tseng, Hsinchu (TW); Chen Cheng Lin, Hsinchu (TW); Yi Chun Kuo, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 19/059,312

(22) Filed: Feb. 21, 2025

(65) Prior Publication Data

US 2025/0291436 A1 Sep. 18, 2025

(30) Foreign Application Priority Data

Mar. 14, 2024 (TW) .................................. 113109351

(51) Int. Cl.
 *G06F 3/041* (2006.01)
 *G06F 3/044* (2006.01)
(52) U.S. Cl.
 CPC .......... *G06F 3/0412* (2013.01); *G06F 3/0445* (2019.05); *G06F 3/0448* (2019.05); *G06F 2203/04103* (2013.01)
(58) Field of Classification Search
 CPC .... G06F 3/0448; G06F 3/0445; G06F 3/0412; G06F 2203/04103
 See application file for complete search history.

(56) References Cited

U.S. PATENT DOCUMENTS

| | | | |
|---|---|---|---|
| 8,166,649 | B2 | 5/2012 | Moore |
| 10,896,948 | B2 | 1/2021 | Lee et al. |
| 11,294,498 | B2 | 4/2022 | Roh et al. |
| 11,303,015 | B2 | 4/2022 | Edwards et al. |
| 2011/0181532 | A1* | 7/2011 | Pan ........................ G06F 3/045 345/173 |

FOREIGN PATENT DOCUMENTS

| | | |
|---|---|---|
| CN | 103135310 | 6/2013 |
| CN | 103268168 | 1/2016 |
| CN | 220473974 | 2/2024 |
| TW | I676977 | 11/2019 |
| TW | 202318086 | 5/2023 |
| WO | 2011059748 | 5/2011 |

* cited by examiner

*Primary Examiner* — Deeprose Subedi
(74) *Attorney, Agent, or Firm* — JCIPRNET

(57) ABSTRACT

A touch display device including a pixel array substrate, a touch substrate, a display medium layer, a first conductive layer, a second conductive layer, and a conductor is provided. The touch substrate is disposed above the pixel array substrate. The display medium layer is disposed between the pixel array substrate and the touch substrate. The first conductive layer is disposed on one surface of the touch substrate. The second conductive layer is disposed on the other surface of the touch substrate. The conductor is disposed along a sidewall of the touch substrate to connect between the first conductive layer and the second conductive layer.

11 Claims, 5 Drawing Sheets

TOUCH DISPLAY DEVICE

CROSS-REFERENCE TO RELATED APPLICATION

This application claims the priority benefit of Taiwan application no. 113109351, filed on Mar. 14, 2024. The entirety of the above-mentioned patent application is hereby incorporated by reference herein and made a part of this specification.

BACKGROUND

Technical Field

The disclosure relates to an electronic device, and more particularly to a touch display device.

Description of Related Art

Various electronic products available in the market have incorporated touch technologies, offering users convenient operation and a sleek appearance. To seamlessly integrate display and touch functionalities, numerous touch display integration technologies have been developed. For instance, the sharing of electrodes for both display and touch is conducive to simplifying product design processes.

SUMMARY

The disclosure provides a touch display device that integrates touch and display functions and ensures high-quality performance.

According to an embodiment of the disclosure, a touch display device including a pixel array substrate, a touch substrate, a display medium layer, a first conductive layer, a second conductive layer, and a conductor is provided. The touch substrate is disposed above the pixel array substrate. The display medium layer is disposed between the pixel array substrate and the touch substrate. The first conductive layer is disposed on one surface of the touch substrate. The second conductive layer is disposed on the other surface of the touch substrate. The conductor is disposed along a sidewall of the touch substrate to connect between the first conductive layer and the second conductive layer.

In an embodiment of the disclosure, the touch display device further includes a circuit board bonded to the touch substrate, electrically connected to the second conductive layer, and electrically connected to the first conductive layer through the conductor.

In an embodiment of the disclosure, the touch substrate includes a first substrate, a second substrate, a first conductive layer, a second conductive layer, and the conductor. The first substrate is disposed between the pixel array substrate and the second substrate. The first conductive layer is disposed on the first substrate and located between the display medium layer and the first substrate. The second conductive layer is disposed on the second substrate and located between the first substrate and the second substrate. The conductor is disposed along a sidewall of the first substrate to connect between the first conductive layer and the second conductive layer.

In an embodiment of the disclosure, the touch display device further includes an optical adhesive disposed between the first substrate and the second substrate.

In an embodiment of the disclosure, the first substrate extends beyond the display medium layer and has a protrusion, and the conductor connects the first conductive layer at the protrusion.

In an embodiment of the disclosure, the second substrate extends beyond the first substrate and has a protrusion, and the conductor is disposed along the sidewall of the first substrate and extends to the protrusion of the second substrate.

In an embodiment of the disclosure, the conductor overlaps and contacts the first conductive layer on the first substrate.

In an embodiment of the disclosure, the touch display device further includes an anti-moisture layer disposed on the first substrate.

In an embodiment of the disclosure, the touch display device further includes a sealing adhesive disposed on the pixel array substrate, surrounding the display medium layer and the touch substrate, and covering the conductor.

In an embodiment of the disclosure, the first conductive layer includes a plurality of first stripe electrodes, each of the first stripe electrodes extends in a first direction, an end of each of the first stripe electrodes extends beyond the display medium layer, and the conductor contacts the end of a corresponding first stripe electrode of the first stripe electrodes.

In an embodiment of the disclosure, the second conductive layer includes a plurality of second stripe electrodes, a plurality of bonding pads, and a plurality of transmission lines, each of the second stripe electrodes extends in a second direction, the first direction and the second direction intersect, the first stripe electrodes are electrically insulated from the second stripe electrodes, and each of the second stripe electrodes, the bonding pads, and the transmission lines are at different voltage levels.

In an embodiment of the disclosure, the touch display device further includes a display driving circuit bonded onto the pixel array substrate.

In light of the foregoing, the touch display panel provided in one or more embodiments of the disclosure utilizes the conductors connected between two substrates to establish the electrical transmission path for the touch electrodes. Such configuration minimizes the likelihood of interference between the circuit structures of the touch function and the display functions. Additionally, the touch display panel provided in one or more embodiments of the disclosure employs the transparent conductive material to fabricate the electrodes of both the display function and the touch function. Due to the corrosion-resistant nature of the transparent conductive material against the display medium layer, the longevity of the electrodes is guaranteed, thereby ensuring high product quality.

In order to make the above-mentioned features and advantages of the disclosure comprehensible, embodiments accompanied with drawings are described in detail below.

BRIEF DESCRIPTION OF THE DRAWINGS

The accompanying drawings, which are included to provide a further understanding of the disclosure, are incorporated in the specification and constitute a part of this specification. The drawings illustrate embodiments of the disclosure and, together with the description, serve to explain the principles of the disclosure.

DESCRIPTION OF THE EMBODIMENTS

Figure 1:
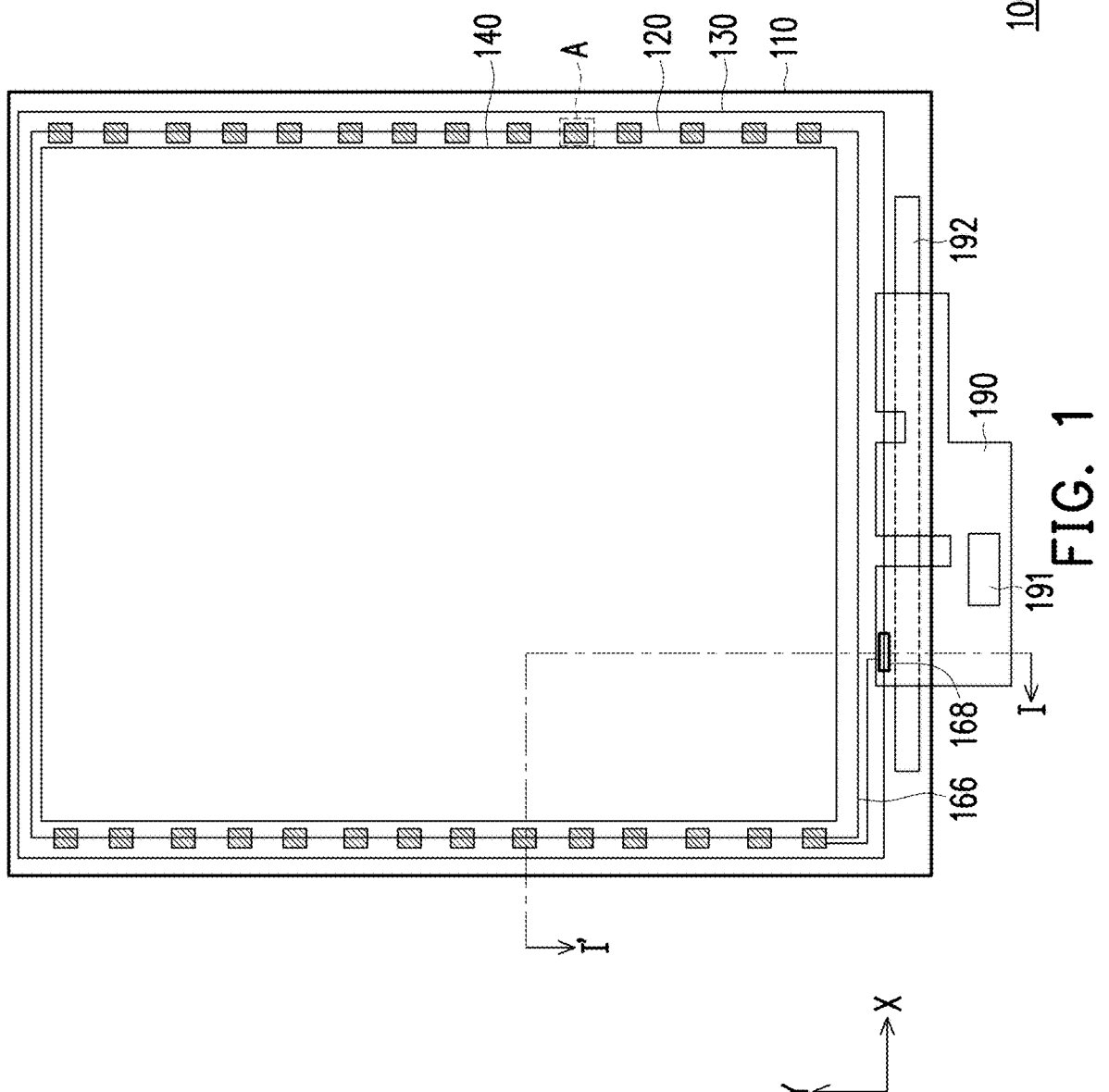
FIG. 1 is a schematic plan view of a touch display device according to an embodiment of the disclosure.
Figure 2:
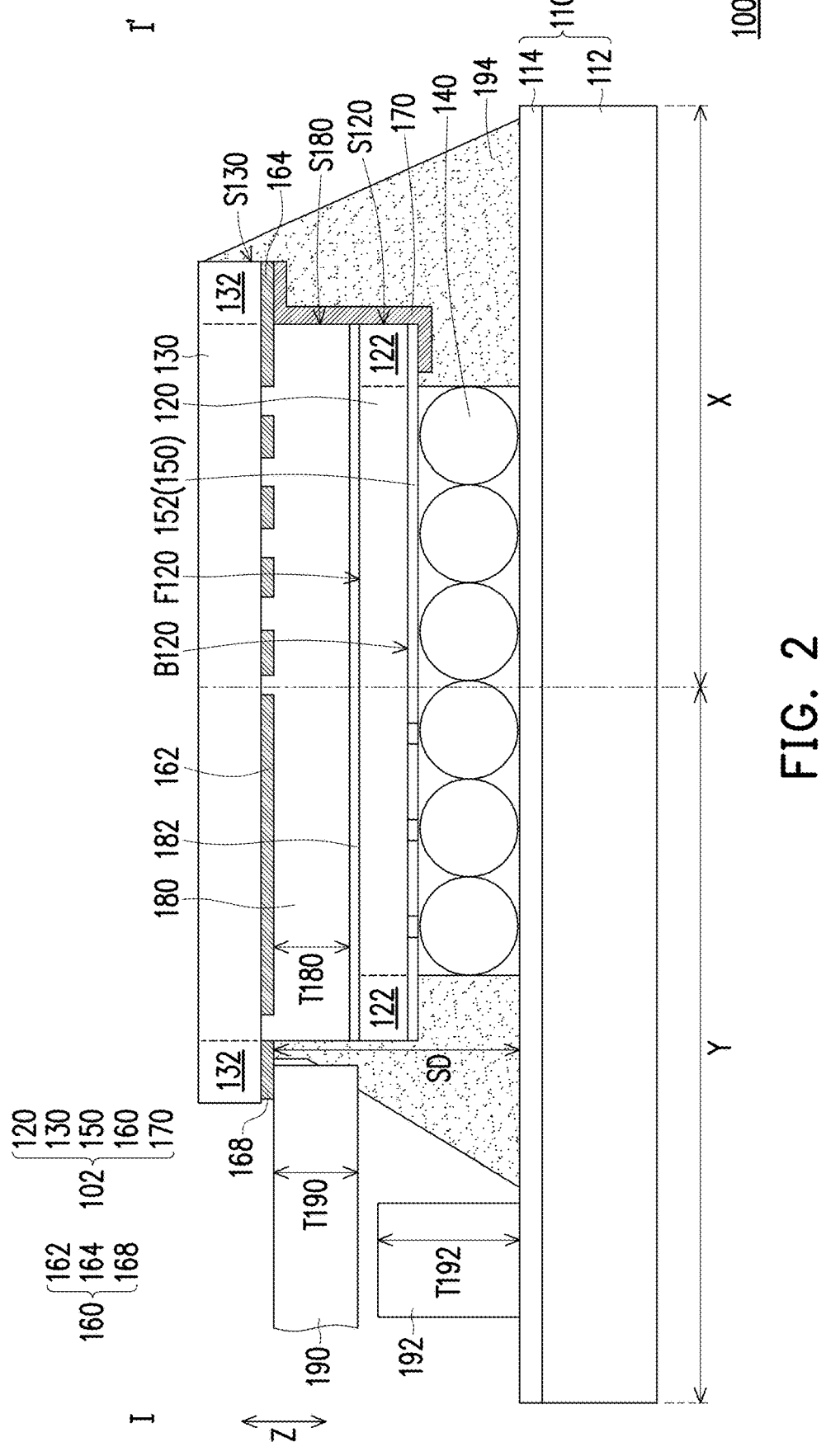
FIG. 2 is a schematic cross-sectional view of the touch display device taken along a line I-I' and depicted in FIG. 1.

FIG. 1 is a schematic plan view of a touch display device according to an embodiment of the disclosure, and FIG. 2 is a schematic cross-sectional view of the touch display device taken along a line I-I' and depicted in FIG. 1. In FIG. 1, for the sake of clarity, the outlines of individual components are shown, but in reality, the stacking order of these components may be learned from FIG. 2. As shown in FIG. 1 and FIG. 2, the touch display device 100 includes a pixel array substrate 110, a first substrate 120, and a second substrate 130. In a Z direction, the pixel array substrate 110, the first substrate 120, and the second substrate 130 are stacked in sequence, and the first substrate 120 is disposed between the pixel array substrate 110 and the second substrate 130. In some embodiments, the pixel array substrate 110 may include a substrate 112 and a pixel array 114 disposed on the substrate 112, where the substrate 112 of the pixel array substrate 110 may be an opaque substrate or a transparent substrate. Both the first substrate 120 and the second substrate 130 are transparent substrates, which may allow display light to penetrate. When a user uses the touch display device 100 and/or watches images shown on the touch display device 100, the second substrate 130 is closer to the user than the pixel array substrate 110.

Materials of the substrate 112, the first substrate 120, and the second substrate 130 may include glass, polymer, or any other material that may be utilized to form substrates. The polymers used for forming the substrates may include cyclo-olefin polymers (COP) or cyclic olefin copolymers (COC), poly(methyl methacrylate) (PMMA), or the like. In some embodiments, the substrate 112, the first substrate 120, and the second substrate 130 may be flexible and used in flexible products.

The touch display device 100 further includes a display medium layer 140 that is disposed between the pixel array substrate 110 and the first substrate 120. In some embodiments, the display medium layer 140 may be an e-paper display layer. For instance, the display medium layer 140 may include an e-paper display material, and the display medium layer 140 may encapsulate the e-paper display material into a layer by applying microcup, microcapsule, or other encapsulation technologies. To drive the display medium layer 140, the touch display device 100 further includes a first conductive layer 150 shown in FIG. 2. The first conductive layer 150 is disposed on the first substrate 120 and located between the display medium layer 140 and the first substrate 120. For instance, the first conductive layer 150 and the pixel array 114 in the pixel array substrate 110 may provide an electric field for driving the display medium layer 140. In some embodiments, a material of the first conductive layer 150 is a transparent conductive material. In some embodiments, the first conductive layer 150 directly contacts the display medium layer 140 without any other film layer sandwiched between the first conductive layer 150 and the display medium layer 140, which should however not be construed as a limitation in the disclosure.

Besides, the touch display device 100 further includes a second conductive layer 160 shown in FIG. 2. The second conductive layer 160 is disposed on the second substrate 130 and located between the first substrate 120 and the second substrate 130. The first conductive layer 150 and the second conductive layer 160 may be spaced from each other by a distance and electrically independent of each other, and therefore a capacitance may be generated between the first conductive layer 150 and the second conductive layer 160, which contributes to implementing the touch function. Therefore, the first conductive layer 150 may be used to implement the display function together with the pixel array 114 and may also be used to implement the touch function together with the second conductive layer 160.

The touch display device 100 further includes a conductor 170. In this embodiment, the touch display device 100 includes a touch substrate 102, and the touch substrate 102 includes a first substrate 120, a second substrate 130, a first conductive layer 150, a second conductive layer 160, and a conductor 170. The first conductive layer 150 is disposed on one surface of the touch substrate 102, the second conductive layer 160 is disposed on the other surface of the touch substrate 102, and the conductor 170 is disposed along a sidewall of the touch substrate 102 to connect between the first conductive layer 150 and the second conductive layer 160. Specifically, the conductor 170 is at least disposed along a sidewall S120 of the first substrate 120 to connect between the first conductive layer 150 and the second conductive layer 160. The conductor 170 overlaps and contacts the first conductive layer 150 on the first substrate 120 and overlaps and contacts the second conductive layer 160 on the second substrate 130. As shown in FIG. 1 and FIG. 2, the first substrate 120 extends beyond the display medium layer 140 and has a protrusion 122, and the conductor 170 connects the first conductive layer 150 at the protrusion 122. The second substrate 130 extends beyond the first substrate 120 and has a protrusion 132, and the conductor 170 is disposed along the sidewall S120 of the first substrate 120 and extends to the protrusion 132 of the second substrate 130. In FIG. 2, the first conductive layer 150 is disposed on a back side B120 of the first substrate 120 facing the display medium layer 140. The conductor 170 may, for instance, contact the first conductive layer 150 on the back side B120 of the first substrate 120, extend along the back side B120 to an edge of the first substrate 120, and then extend along the sidewall S120 of the first substrate 120 towards the second substrate 130 extends until the conductor 170 partially covers the protrusion 132 of the second substrate 130. In other words, the conductor 170 may be disposed along a stepped path in FIG. 2. Additionally, a portion of the second conductive layer 160 (such as bonding pads 164) may be disposed at the protrusion 132 for connection to the conductor 170.

In some embodiments, the touch display device 100 further includes an optical adhesive 180, and the optical adhesive 180 is disposed between the first substrate 120 and the second substrate 130. Specifically, both the first substrate 120 and the optical adhesive 180 are disposed between the first conductive layer 150 and the second conductive layer 160. The optical adhesive 180 may be used to adhere the second substrate 130 to the first substrate 120 and allows light to penetrate. The contour of the optical adhesive 180 may roughly align with the first substrate 120. The conductor 170, for instance, may extend along the sidewall S120 of the first substrate 120 and a sidewall S180 of the optical adhesive 180 from the protrusion 122 of the first substrate 120 to the protrusion 132 of the second substrate 130. In some embodiments, refractive indices of the first substrate 120 and the second substrate 130 may be close to or even the same as a refractive index of the optical adhesive 180, so as to provide good display light transmittance. In FIG. 2, while the thickness and the proportions of each layer (such as the optical adhesive, the substrates, and so on) represent embodiments of the disclosure, they are not intended to be limiting in the disclosure, and adjustments to these proportions and thicknesses may be made based on actual design requirements.

In some embodiments, the touch display device 100 further includes an anti-moisture layer 182. The anti-moisture layer 182 is disposed on the first substrate 120, and the anti-moisture layer 182 and the first conductive layer 150 are disposed on opposite sides of the first substrate 120. For instance, the anti-moisture layer 182 is disposed on a front side F120 of the first substrate 120, while the first conductive layer 150 is disposed on the back side B120 of the first substrate 120. The anti-moisture layer 182 may be used to block invading moisture to protect the display medium layer 140 from degradation and/or damage due to moisture. In some embodiments, the anti-moisture layer 182 and the first conductive layer 150 are disposed on the same side of the first substrate 120, for instance, the back side B120. In some embodiments, the anti-moisture layer 182 may be simultaneously disposed on both the front side F120 and the back side B120 of the first substrate 120.

In some embodiments, the touch display device 100 further includes a circuit board 190. The circuit board 190 is bonded to the second substrate 130 of the touch substrate 102, electrically connected to the second conductive layer 160, and electrically connected to the first conductive layer 150 through the conductor 170. In other words, the circuit board 190 may be electrically connected to the first conductive layer 150 through a signal transmission path established by the conductor 170 and the second conductive layer 160 on the second substrate 130. The circuit board 190 may transmit signals to the first conductive layer 150 through the second conductive layer 160 and the conductor 170 to achieve the transmission of touch signals. A touch circuit chip 191 having the touch function may be arranged on the circuit board 190 to control, receive and/or calculate the touch signals carried by the first conductive layer 150 and the second conductive layer 160. In some embodiments, the circuit board 190 may be a flexible circuit board.

In some embodiments, the touch display device 100 further includes a display driving circuit 192 that is bonded to the pixel array substrate 110 and electrically connected to the pixel array 114. Here, the display driving circuit 192 and the circuit board 190 are respectively bonded to the pixel array substrate 110 and the second substrate 130, and the display driving circuit 192 and the circuit board 190 may be arranged on the same side of the touch display device 100, as shown in FIG. 1. Since the circuit board 190 is bonded to the second substrate 130 rather than to the first substrate 120, the display driving circuit 192 and the circuit board 190 may be appropriately separated without structural interference. In some embodiments, the sum of a thickness T192 of the display driving circuit 192 and a thickness T190 of the circuit board 190 may be no greater than a distance SD between the pixel array substrate 110 and the second substrate 130. As such, the setup of external components required for the operation of the display function and the touch function of the touch display device 100 may be facilitated. In some embodiments, the thickness T192 of the display driving circuit 192 may be less than the thickness T180 of the optical adhesive 180.

Additionally, the circuit board 190 is bonded to the second substrate 130 without necessitating a bonding step on the first substrate 120. Consequently, the temperature applied during bonding does not impact the first substrate 120 and components on the first substrate, thereby safeguarding the components against potential damage throughout the manufacturing process. For instance, the anti-moisture layer 182 disposed on the first substrate 120 is particularly sensitive to temperature variations. In some embodiments, the temperature of the bonding process may potentially lead to degradation of the anti-moisture layer 182. Therefore, the method of not subjecting the first substrate 120 to the bonding process helps to maintain the quality of the anti-moisture layer 182 without damage. Therefore, avoiding bonding the first substrate 120 helps protect the anti-moisture layer 182 and ensure its quality remains intact without any damage.

In some embodiments, the touch display device 100 further includes a sealing adhesive 194. The sealing adhesive 194 is disposed on the pixel array substrate 110, surrounds the display medium layer 140, the first substrate 120, and the second substrate 130, and covers the conductor 170. The sealing adhesive 194 may be disposed along the periphery of the touch display device 100 to block lateral invasion of moisture, thereby protecting the display medium layer 140 from damage and/or degradation due to moisture. As shown in FIG. 2, the sealing adhesive 194 may be continuously distributed between the pixel array substrate 110 and the second substrate 130, thus effectively blocking lateral moisture. In some embodiments, the sealing adhesive 194 may extend to cover a sidewall S130 of the second substrate 130.

Figure 3:
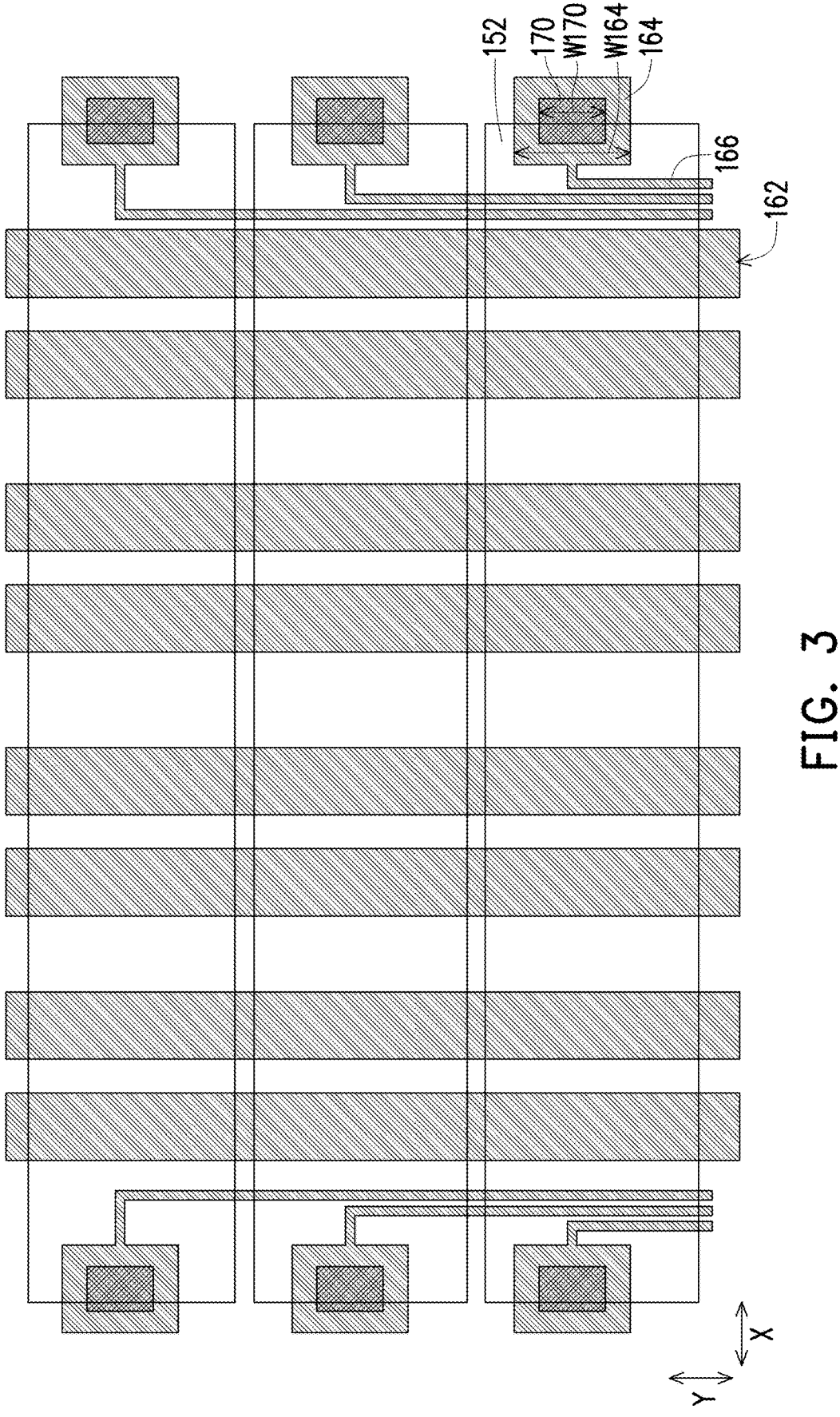
FIG. 3 illustrates the layout of a first conductive layer and a second conductive layer according to some embodiments.

For better illustration and explanation, the first conductive layer 150 and the second conductive layer 160 are omitted in FIG. 1, and FIG. 3 shows the layout of the first and second conductive layers in some embodiments. With reference to FIG. 1 to FIG. 3, in some embodiments, the first conductive layer 150 may include a plurality of first stripe electrodes 152, and each first stripe electrode 152 extends in an X direction. The second conductive layer 160 includes a plurality of second stripe electrodes 162, each second stripe electrode 162 extends in a Y direction, and the X direction intersects with the Y direction. The first stripe electrodes 152 and the second stripe electrodes 162 are electrically insulated and have different voltage levels, so as to provide the touch sensing function. In some embodiments, a width of the first stripe electrodes 152 in the Y direction may be greater than a width of the second stripe electrodes 162 in the X direction. The first conductive layer 150 and the second conductive layer 160 may provide the touch sensing function and may be considered as touch units. Here, the first stripe electrodes 152 may also be used together with the pixel array 114 in FIG. 2 for performing the display function.

In some embodiments, an end of each first stripe electrode 152 extends beyond the display medium layer 140 and is partially located on the protrusion 122 of the first substrate 120, and the conductor 170 may contact the end of a corresponding first stripe electrode 152 of the first stripe electrodes. In other words, the conductor 170 contacts the corresponding first stripe electrode 152 at the protrusion 122. In some embodiments, the conductor 170 is disposed at both ends of each first stripe electrode 152. In some embodiments, a plurality of conductors 170 may be disposed at one end of each first stripe electrode 152. In some embodiments, each first stripe electrode 152 may extend to an edge of the first substrate 120. In some embodiments, each first stripe electrode 152 may be spaced from the edge of the first substrate 120 by a distance.

The second conductive layer 160 may further include a bonding pad 164, and the bonding pad 164 may be disposed on the protrusion 132 of the second substrate 130 corresponding to the conductor 170. The conductor 170 may extend from the ends of the first stripe electrodes 152 to overlap and contact the bonding pad 164 to establish the required signal transmission path. Specifically, the conductor 170 may extend from the end of the corresponding first stripe electrode 152 towards the edge of the first substrate 120 and may then be disposed along the sidewall S120 of the first substrate 120 and may further cover the bonding pad 164 located on the protrusion 132. In some embodiments, a width W164 of the bonding pad 164 may be greater than the width W170 of the conductor 170, where the width W170 of the conductor 170 may be adjusted as needed, e.g., 0.6 mm to 0.8 mm, which should however not be construed as a limitation in the disclosure.

The second conductive layer 160 may further include transmission lines 166 and bonding pads 168, where due to the limitations to the graphical representation, FIG. 1 simply shows one transmission line 166 and one bonding pad 168, FIG. 2 omits the transmission line 166, and FIG. 3 omits the bonding pad 168. Practically, there are a plurality of transmission lines 166 and a plurality of bonding pads 168 disposed in the touch display device 100. The transmission lines 166 may be connected between the bonding pad 164 and the corresponding bonding pads 168, and the circuit board 190 may be bonded to the bonding pads 168 to establish the required signal transmission path. In some embodiments, although not shown in the drawings, some of the transmission lines 166 may be connected between the second stripe electrodes 162 and the corresponding bonding pads 168, and thus the second stripe electrodes 162 may also be connected to the circuit board 190 through the transmission lines 166 and the corresponding bonding pads 168. In this embodiment, the first conductive layer 150 and the second conductive layer 160 constitute a touch unit, and the transmission lines 166 and the bonding pads 168 required by the touch unit are all made using the second conductive layer 160, and thus the circuit board 190 is simply required to be bonded to the second substrate 130. A first touch voltage signal on the circuit board 190 is transmitted to the first stripe electrodes 152 of the first conductive layer 150 through the bonding pads 168, the transmission lines 166, the bonding pad 164, and the conductor 170, and a second touch voltage signal on the circuit board 190 is transmitted to the second stripe electrodes 162 of the second conductive layer 160 through another conductive line (not shown). The first touch voltage signal and the second touch voltage signal are signals of different voltage levels, so as to provide the touch sensing function. Therefore, the bonding pads 168, the transmission lines 166, the bonding pad 164, and the second stripe electrodes 162 of the second conductive layer 160 have different voltage levels. The bonding pads 168, the transmission lines 166, and the bonding pad 164 of the second conductive layer 160 and the first conductive layer 150 and the first stripe electrodes 152 are electrically connected and have the same voltage level.

Each first stripe electrode 152 may be made of a conductive material that is non-elemental metal or metal alloy. For instance, each first stripe electrode 152 may be made of a transparent conductive material, and the transparent conductive material includes, for instance, conductive metal oxides, conductive organics, or the like. Each first stripe electrode 152 that contact the display medium layer 140 is made of a conductive material that is non-elemental metal or metal alloy, which may prevent elemental metals or metal alloys from being corroded by the display medium layer 140. Hence, the touch display device 100 may achieve high quality and an optimal lifespan. In some embodiments, a material of the first conductive layer 150 is a transparent conductive material, allowing the display light to penetrate. This ensures that the touch display device 100 maintains good display performance.

The bonding pad 164, the transmission lines 166, and the bonding pads 168 are all formed using the same film layer as that used by the second stripe electrodes 162, so as to constitute the second conductive layer 160. A material of the second conductive layer 160 may include elemental metals, metal alloys, or the like. When a user watches display images on the touch display device 100, the second conductive layer 160, compared to the display medium layer 140, is located closer to the user, and the opacity of the second conductive layer 160 may pose an impact on the display images. However, the second stripe electrodes 162 are made of metal with good conductivity and may have a relatively fine line width, or the second stripe electrodes 162 may be disposed corresponding to the pixel boundaries in the pixel array 114, thereby enabling the touch display device 100 to still achieve the optimal display performance. In some embodiments, the second conductive layer 160 may be made of a transparent conductive material. In some embodiments, the material of the second conductive layer 160 includes metal elements, metal alloys, conductive oxides, organic conductive materials, or a combination of the above.

A material of the conductor 170 includes a conductive material that may be correspondingly disposed on a three-dimensional surface, such as a conductive polymer material (poly(3,4-ethylenedioxythiophene): poly(styrenesulfonate) (PEDOT: PSS)), silver paste, tin paste, and any other conductive material. The conductor 170 may be made by coating, printing, deposition, and so on, so as to be disposed between the first conductive layer 150 and the second conductive layer 160 along a stepped path. The conductor 170 may partially cover both the first conductive layer 150 and the second conductive layer 160 to establish an effective signal transmission path. In some embodiments, a contact impedance of the conductor 170 disposed along the three-dimensional surface may be approximately 85 ohms.

Figure 4:
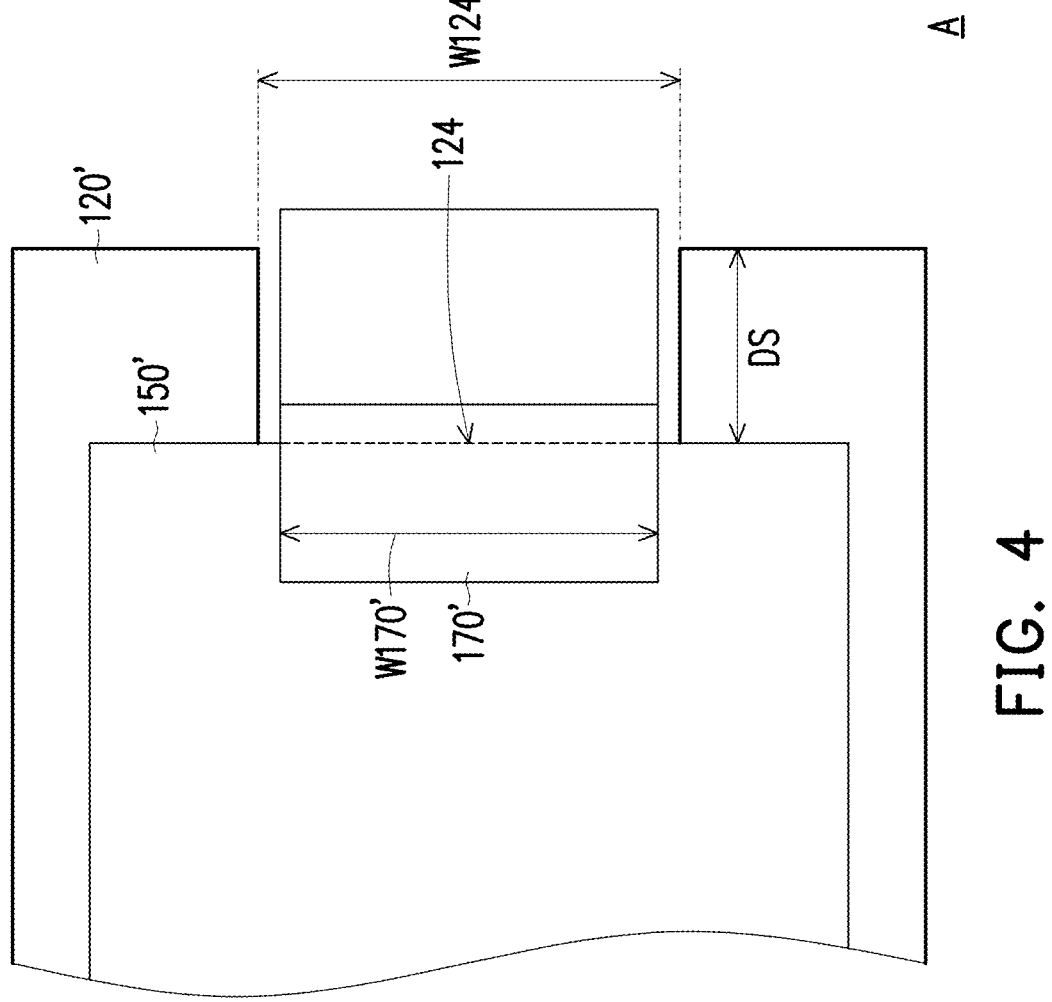
FIG. 4 is a schematic enlarged view of some components in a touch display device according to some embodiments of the disclosure.
Figure 5:
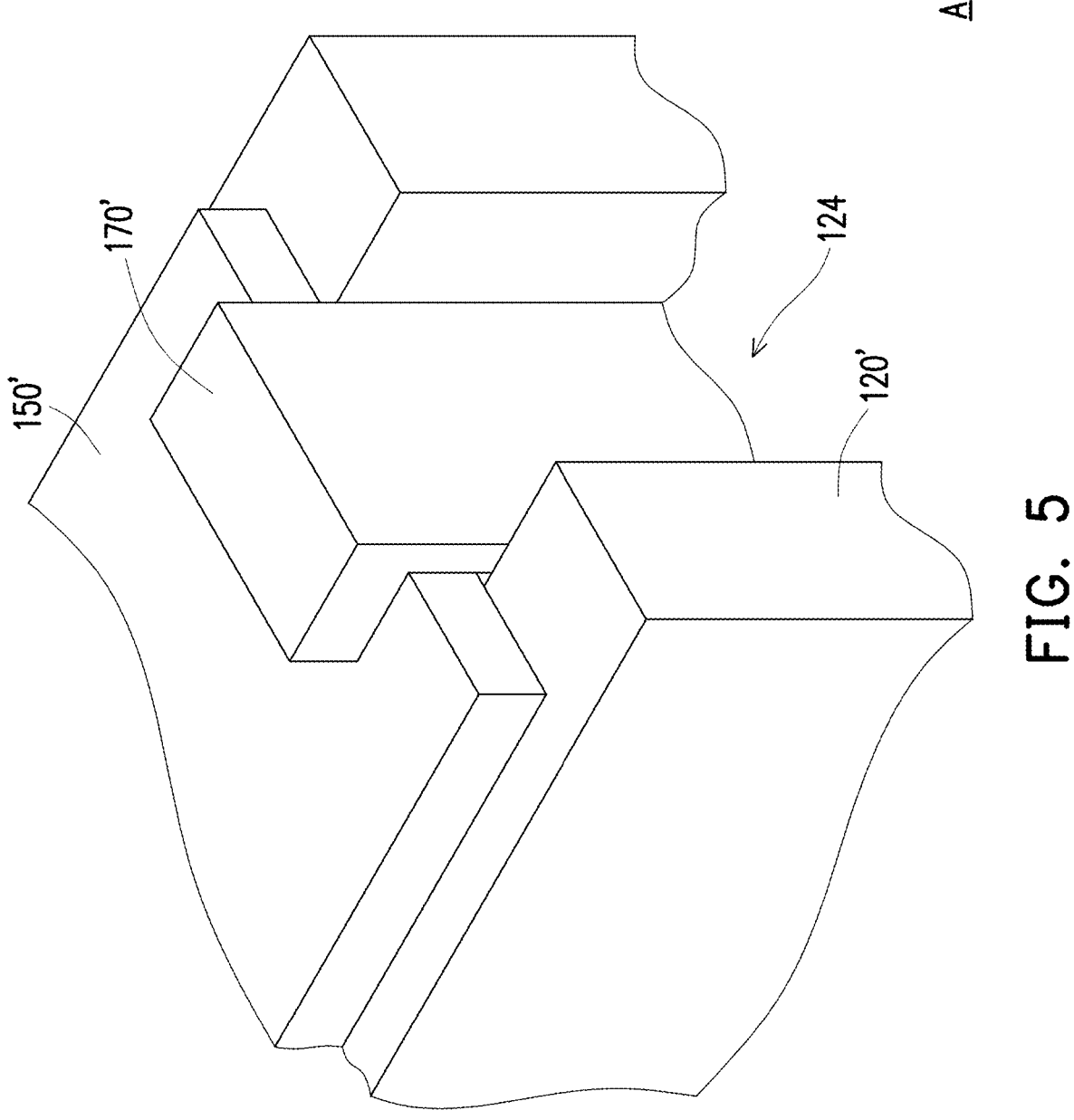
FIG. 5 is a schematic three-dimensional view of the structure depicted in FIG. 4.

FIG. 4 is a schematic enlarged view of some components in a touch display device according to some embodiments of the disclosure, and FIG. 5 is a schematic three-dimensional view of the structure depicted in FIG. 4. For convenience of description, structures shown in FIG. 4 and FIG. 5 correspond to the region A in FIG. 1, and FIG. 4 and FIG. 5 simply show a first substrate 120', a first conductive layer 150', and a conductor 170', while other components are omitted. The structures in FIG. 4 and FIG. 5 may serve to illustrate the possible implementation manner of the first substrate 120, the first conductive layer 150, and the conductor 170 in the touch display panel 100 depicted in FIG. 1 to FIG. 3.

In FIG. 4 and FIG. 5, the first substrate 120' has an edge groove 124, and the conductor 170' is positioned along the edge groove 124. The edge groove 124 is an indented structure situated at the edge of the first substrate 120', resulting in a sawtooth-shaped edge in the plan view of the first substrate 120'. An end of the first conductive layer 150' may be aligned or close to the edge groove 124. In some embodiments, the end of the first conductive layer 150' and the outermost edge of the first substrate 120' may be spaced from each other by a distance DS, and an indented depth of the edge groove 124 roughly corresponds to the distance DS.

In some embodiments, the contour of the first conductive layer 150' may conform to the contour of the edge groove 124, i.e., a sawtooth-shaped end contour. The conductor 170' may contact the end of the first conductive layer 150' near the edge groove 124. In some embodiments, a width W170' of the conductor 170' may roughly correspond to a width W124 of the edge groove 124. In some embodiments, the width W170' of the conductor 170' may be greater than the width W124 of the edge groove 124.

To sum up, the touch display device provided in one or more embodiments of the disclosure uses the transparent conductive material to fabricate the first conductive layer that contacts the display medium layer, making the first conductive layer less susceptible to corrosion by the material of the display medium layer. In addition, the first conductive layer serves as a conductive layer with both touch and sensing functions, which is conducive to reducing the overall thickness of the touch display device. The touch display device provided in one or more embodiments of the disclosure uses the conductor disposed along the sidewall of the first substrate to electrically connect the first conductive layer on the first substrate to the second conductive layer on the second substrate. Thereby, the circuit board is bonded to the second substrate instead of the first substrate. When the driving circuit of the pixel array substrate and the circuit board are disposed on the same side, the arrangement of the driving circuit and the circuit board has more flexibility, and the driving circuit and the circuit board do not interfere with each other. Since the steps of bonding the circuit board are performed on the second substrate, the components on the first substrate need not withstand the temperature and/or pressure of the bonding process, which contributes to maintaining the quality of the components.

It will be apparent to those skilled in the art that various modifications and variations may be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A touch display device, comprising:
a pixel array substrate;
a touch substrate, wherein the touch substrate is disposed above the pixel array substrate;
a display medium layer, disposed between the pixel array substrate and the touch substrate;
a first substrate;
a second substrate, wherein the first substrate is disposed between the pixel array substrate and the second substrate;
a first conductive layer, disposed on the first substrate and located between the display medium layer and the first substrate;
a second conductive layer, disposed on the second substrate and located between the first substrate and the second substrate; and
a conductor, disposed along a sidewall of the first substrate to connect between the first conductive layer and the second conductive layer.

2. The touch display device according to claim 1, further comprising a circuit board bonded to the touch substrate, electrically connected to the second conductive layer, and electrically connected to the first conductive layer through the conductor.

3. The touch display device according to claim 1, further comprising an optical adhesive disposed between the first substrate and the second substrate.

4. The touch display device according to claim 1, wherein the first substrate extends beyond the display medium layer and has a protrusion, and the conductor connects the first conductive layer at the protrusion.

5. The touch display device according to claim 1, wherein the second substrate extends beyond the first substrate and has a protrusion, and the conductor extends to the protrusion of the second substrate.

6. The touch display device according to claim 1, wherein the conductor overlaps and contacts the first conductive layer on the first substrate.

7. The touch display device according to claim 1, further comprising an anti-moisture layer disposed on the first substrate.

8. The touch display device according to claim 1, further comprising a display driving circuit bonded onto the pixel array substrate.

9. A touch display device, comprising:
a pixel array substrate;
a touch substrate, wherein the touch substrate is disposed above the pixel array substrate;
a display medium layer, disposed between the pixel array substrate and the touch substrate;
a first conductive layer, disposed on one surface of the touch substrate;
a second conductive layer, disposed on the other surface of the touch substrate;
a conductor, disposed along a sidewall of the touch substrate to connect between the first conductive layer and the second conductive layer; and
a sealing adhesive, disposed on the pixel array substrate, surrounding the display medium layer and the touch substrate, and covering the conductor.

10. A touch display device, comprising:
a pixel array substrate;
a touch substrate, wherein the touch substrate is disposed above the pixel array substrate;
a display medium layer, disposed between the pixel array substrate and the touch substrate;
a first conductive layer, disposed on one surface of the touch substrate;
a second conductive layer, disposed on the other surface of the touch substrate; and
a conductor, disposed along a sidewall of the touch substrate to connect between the first conductive layer and the second conductive layer,
wherein the first conductive layer comprises a plurality of first stripe electrodes, each of the first stripe electrodes extends in a first direction, an end of each of the first stripe electrodes extends beyond the display medium layer, and the conductor contacts the end of a corresponding first stripe electrode of the first stripe electrodes.

11. The touch display device according to claim 10, wherein the second conductive layer comprises a plurality of second stripe electrodes, a plurality of bonding pads, and a plurality of transmission lines, each of the second stripe electrodes extends in a second direction, the first direction and the second direction intersect, the first stripe electrodes are electrically insulated from the second stripe electrodes, and each of the second stripe electrodes, the bonding pads, and the transmission lines are at different voltage levels.

* * * * *